(12) United States Patent
Chance et al.

(10) Patent No.: US 11,687,662 B2
(45) Date of Patent: Jun. 27, 2023

(54) SYSTEM AND METHOD FOR INTELLIGENT IDENTIFICATION OF CONTENT DATA IN FILES AND MULTI-RECIPIENTS CONTROL

(71) Applicant: JPMorgan Chase Bank, N.A., New York, NY (US)

(72) Inventors: Ian M Chance, London (GB); Shalini Kumari, Nalanda (IN); Monicka Nagaraj, Coimbatore (IN); Parminder Arora, Philadelphia, PA (US); Yasha Naik, Bengaluru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 115 days.

(21) Appl. No.: 17/201,972

(22) Filed: Mar. 15, 2021

(65) Prior Publication Data

US 2022/0292209 A1 Sep. 15, 2022

(51) Int. Cl.
*G06F 21/62* (2013.01)
*H04L 51/08* (2022.01)
*G06Q 10/107* (2023.01)
*G06F 21/60* (2013.01)
*H04L 51/48* (2022.01)
(Continued)

(52) U.S. Cl.
CPC ........ *G06F 21/6209* (2013.01); *G06F 21/604* (2013.01); *G06Q 10/107* (2013.01); *H04L 51/08* (2013.01); *H04L 51/212* (2022.05); *H04L 51/48* (2022.05); *G06F 40/18* (2020.01)

(58) Field of Classification Search
CPC .... G06F 21/6209; G06F 21/604; G06F 40/18; G06Q 10/107; H04L 51/08; H04L 51/212; H04L 51/48
See application file for complete search history.

(56) References Cited

U.S. PATENT DOCUMENTS

| | | |
|---|---|---|
| 2002/0194487 A1 | 12/2002 | Grupe |
| 2004/0064710 A1 | 4/2004 | Vanistein |
| 2006/0036699 A1 | 2/2006 | Bauchot et al. |

(Continued)

OTHER PUBLICATIONS

Official Communication (Search Report and Opinion) received in PCT/US2021/022365, dated May 26, 2021.
(Continued)

*Primary Examiner* — Suraj M Joshi
*Assistant Examiner* — Jaren Means
(74) *Attorney, Agent, or Firm* — Greenblum & Bernstein, P.L.C.

(57) ABSTRACT

Various methods, apparatuses/systems, and media for intelligent identification of content data in files are disclosed. A receiver receives a request from a user to send an electronic mail (email) for external communication outside of an organization's internal network. A processor detects whether the email includes a file as an attachment to the email; scans the file for content data; tags and highlights the content data for preview check and for receiving user's input of confirmation data when it is determined that the email includes an external recipient. The receiver receives the user's input of confirmation data whether the external recipient is a recipient who is authorized to obtain the file including the content data. The processor transmits the email to the external recipient in response to receiving a positive user's input of confirmation data.

20 Claims, 8 Drawing Sheets

(51) Int. Cl.
*H04L 51/212* (2022.01)
*G06F 40/18* (2020.01)

(56) References Cited

U.S. PATENT DOCUMENTS

| | | | | |
|---|---|---|---|---|
| 2007/0294428 A1* | 12/2007 | Guy | ............ | G06Q 10/107 |
| | | | | 709/245 |
| 2009/0178144 A1* | 7/2009 | Redlich | ............ | G06F 21/6209 |
| | | | | 726/27 |
| 2015/0264111 A1 | 9/2015 | Aleksandrov | | |
| 2020/0067861 A1* | 2/2020 | Leddy | ............ | G06F 21/6245 |

OTHER PUBLICATIONS

Al Sharif et al. "EPDA: Efficient and privacy-preserving data collection and access control scheme for multi-recipient AMI networks." IEEE Access 7 (2019)2: 7829-27845. Feb. 21, 2019 (Feb. 21, 2019) Retrieved on May 10, 2021 (May 1, 2021) from <https:///ieeexplore.ieee.org/abstract/ocumen/8648329.

Rockley et al. "An intelligent content strategy for the enterprise." Bulletin of the American Society for Information Science and Technology 37.2 (2011); 33-39. Jan. 10, 2011 (Jan. 10, 2011) Retrieved on May 10, 2021 (May 10, 2021) from <https://asistdl.onlinelibray.wiley.com/doi/full/10.1002/bult.2011.1720370211.

* cited by examiner

Email Verification Window 602

By clicking the box(es) below, you confirm that your:
- CHECKED that the message and attachments are correct and appropriate for ALL recipients
- HAVE NOT removed watermarks (e.g. Company Internal Use Only) intended to prevent sending the email or attachment externally
- ARE NOT SENDING an email with Company business information to an external email address for any non-business purpose or to your personal email account for any reason ① ☐ xxxxxx.xxxx.com
　☐ xxxxxxx@xxxx.com Select All ② Attachments 608

| FileName | HiddenData | FilteredData | FormulaData 609 |
|---|---|---|---|
| Book2.xlsx | Yes | Yes | Yes |
| Book1.xlsx | Yes | No | No ④ |
| Book3.xlsx | No | ⑤ Hidden Sheets: Sheet1 | |
| Book4.xlsx | No | | |
| Book5.xlsx | No | Value Sheet1, Column 11, Rows 10 | |

③

⑥

⑦ Send 610　　Cancel 612

FIG. 6

SYSTEM AND METHOD FOR INTELLIGENT IDENTIFICATION OF CONTENT DATA IN FILES AND MULTI-RECIPIENTS CONTROL

TECHNICAL FIELD

This disclosure generally relates to data processing, and, more particularly, to methods and apparatuses for implementing an intelligent identification of content data module and multi-recipients control module that provide platforms for intelligently scanning and detecting hidden data, filtered data, and formulas in files, and tagging and highlighting the data to a user for preview check before the data is being sent out externally to one or more electronic mail (email) recipients.

BACKGROUND

Today, large enterprises, corporations, agencies, institutions, and other organizations are facing a continuing problem of addressing data leakages in a quick, expedited, and accurate manner. For example, in general, most data leakages may occur due to incorrect exchange to unauthorized or unintended recipients which may contain attachments. One of the reasons for incorrect data exchange may be hidden content (i.e., hidden data, filtered data, formula, etc.) in the attachment files. Particularly, examples in hidden or filtered or formula content data may be available in attachment files (i.e., Excel files). These hidden or filtered or formula content data in excel files may get easily unnoticed and unintended share of such data may prove to be contributing to several data leakages in an organization, thereby particularly causing reputational impact

SUMMARY

The present disclosure, through one or more of its various aspects, embodiments, and/or specific features or sub-components, provides, among other features, various systems, servers, devices, methods, media, programs, and platforms for implementing an intelligent identification of content data module and multi-recipients control module that provide platforms for intelligently scanning and detecting hidden data, filtered data, and formulas in files (e.g., Microsoft office applications, but the disclosure is not limited thereto), and tagging and highlighting the data to a user for preview check before the data is being sent out externally to one or more email recipients, thereby addressing and/or eliminating data leakages in a quick, expedited, and accurate manner and minimizing data loss, but the disclosure is not limited thereto. According to exemplary embodiments, the Microsoft office applications may include Excel files, but the disclosure is not limited thereto. Although Excel file is being described herein as an exemplary use case, the disclosure is not limited thereto. The disclosed intelligent detection of hidden or filtered or formula content can be extended to other similar applications, e.g., Google sheets.

According to an aspect of the present disclosure, a method for intelligent identification of content data in files by utilizing one or more processors and one or more memories is disclosed. The method may include: receiving a request from a user to send an electronic mail (email) for external communication outside of an organization's internal network; detecting whether the email includes a file as an attachment to the email: scanning the file for content data: tagging and highlighting the content data for preview check and for receiving user's input of confirmation data when it is determined that the email includes an external recipient; receiving the user's input of confirmation data whether the external recipient is a recipient who is authorized to obtain the file including the content data; and transmitting the email to the external recipient in response to receiving a positive user's input of confirmation data.

According to a further aspect of the present disclosure, wherein the content data may include one or more of the following data: hidden data, filtered sheets data, filtered columns data, filtered rows data, and data containing formulas, but the disclosure is not limited thereto.

According to yet another aspect of the present disclosure, the method may further include: generating a hover box indicating location of the content data including location of hidden data, filtered content data, or formulas within the file, wherein the location may include one or more of the locations in the file: sheets, columns, and rows, but the disclosure is not limited thereto.

According to another aspect of the present disclosure, the method may further include: blocking transmission of the email to the external recipient in response to receiving a negative user's input of confirmation data.

According to an additional aspect of the present disclosure, the method may further include: removing the content data from the file in response to receiving a negative user's input of confirmation data; and transmitting the email to the external recipient with the attached file having the content data being removed from the file.

According to a further aspect of the present disclosure, the method may further include: receiving user's input of ticking separate attachments for affirming that these attachments can be selected for release.

According to yet another aspect of the present disclosure, the method may further include: determining whether the email is addressed to multiple external recipients in a "to" and/or a "cc" line of the email: and prompting a message box for receiving user's input for selecting a cancel icon, a revert icon, or a continue icon.

According to another aspect of the present disclosure, the method may further include: automatically transmitting the email by putting all recipients in a "bcc" line of the email in response to receiving user's input for selecting the continue icon.

According to an additional aspect of the present disclosure, the method may further include: automatically transmitting the email by maintaining all recipients in the original "to" and/or "cc" line of the email in response to receiving user's input for selecting the revert icon.

According to yet another aspect of the present disclosure, the method may further include: automatically blocking transmission of the email in response to receiving user's input for selecting the cancel icon.

According to an aspect of the present disclosure, a system for intelligent identification of content data in files is disclosed. The system may include a processor and one or more memories operatively connected to the processor via a communication network. The processor may be configured to: receive a request from a user to send an electronic mail (email) for external communication outside of an organization's internal network; detect whether the email includes a file as an attachment to the email; scan the file for content data; tag and highlight the content data for preview check and for receiving user's input of confirmation data when it is determined that the email includes an external recipient; receive the user's input of confirmation data whether the external recipient is a recipient who is authorized to obtain the file including the content data; and transmit the email to the external recipient in response to receiving a positive user's input of confirmation data.

According to yet another aspect of the present disclosure, the processor may be further configured to: generate a hover box indicating location of the content data including location of hidden data, filtered content data, or formulas within the file, wherein the location may include one or more of the locations in the file: sheets, columns, and rows, but the disclosure is not limited thereto.

According to another aspect of the present disclosure, the processor may be further configured to: block transmission of the email to the external recipient in response to receiving a negative user's input of confirmation data.

According to an additional aspect of the present disclosure, the processor may be further configured to: remove the content data from the file in response to receiving a negative user's input of confirmation data; and transmit the email to the external recipient with the attached file having the content data being removed from the file.

According to yet another aspect of the present disclosure, the processor may be further configured to: determine whether the email is addressed to multiple external recipients in a "to" and/or a "cc" line of the email, and prompt a message box for receiving user's input for selecting a cancel icon, a revert icon, or a continue icon.

According to another aspect of the present disclosure, the processor may be further configured to: automatically transmit the email by putting all recipients in a "bcc" line of the email in response to receiving user's input for selecting the continue icon.

According to an additional aspect of the present disclosure, the processor may be further configured to: automatically transmit the email by maintaining all recipients in the original "to" and/or "cc" line of the email in response to receiving user's input for selecting the revert icon.

According to yet another aspect of the present disclosure, the processor may be further configured to: automatically block transmission of the email in response to receiving user's input for selecting the cancel icon.

According to another aspect of the present disclosure, a non-transitory computer readable medium configured to store instructions for intelligent identification of content data in files is disclosed. The instructions, when executed, may cause a processor to: receive a request from a user to send an electronic mail (email) for external communication outside of an organization's internal network; detect whether the email includes a file as an attachment to the email; scan the file for content data; tag and highlight the content data for preview check and for receiving user's input of confirmation data when it is determined that the email includes an external recipient; receive the user's input of confirmation data whether the external recipient is a recipient who is authorized to obtain the file including the content data; and transmit the email to the external recipient in response to receiving a positive user's input of confirmation data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 illustrates another an exemplary preview check of content data in attachment files in according with an exemplary embodiment.

DETAILED DESCRIPTION

Figure 1:
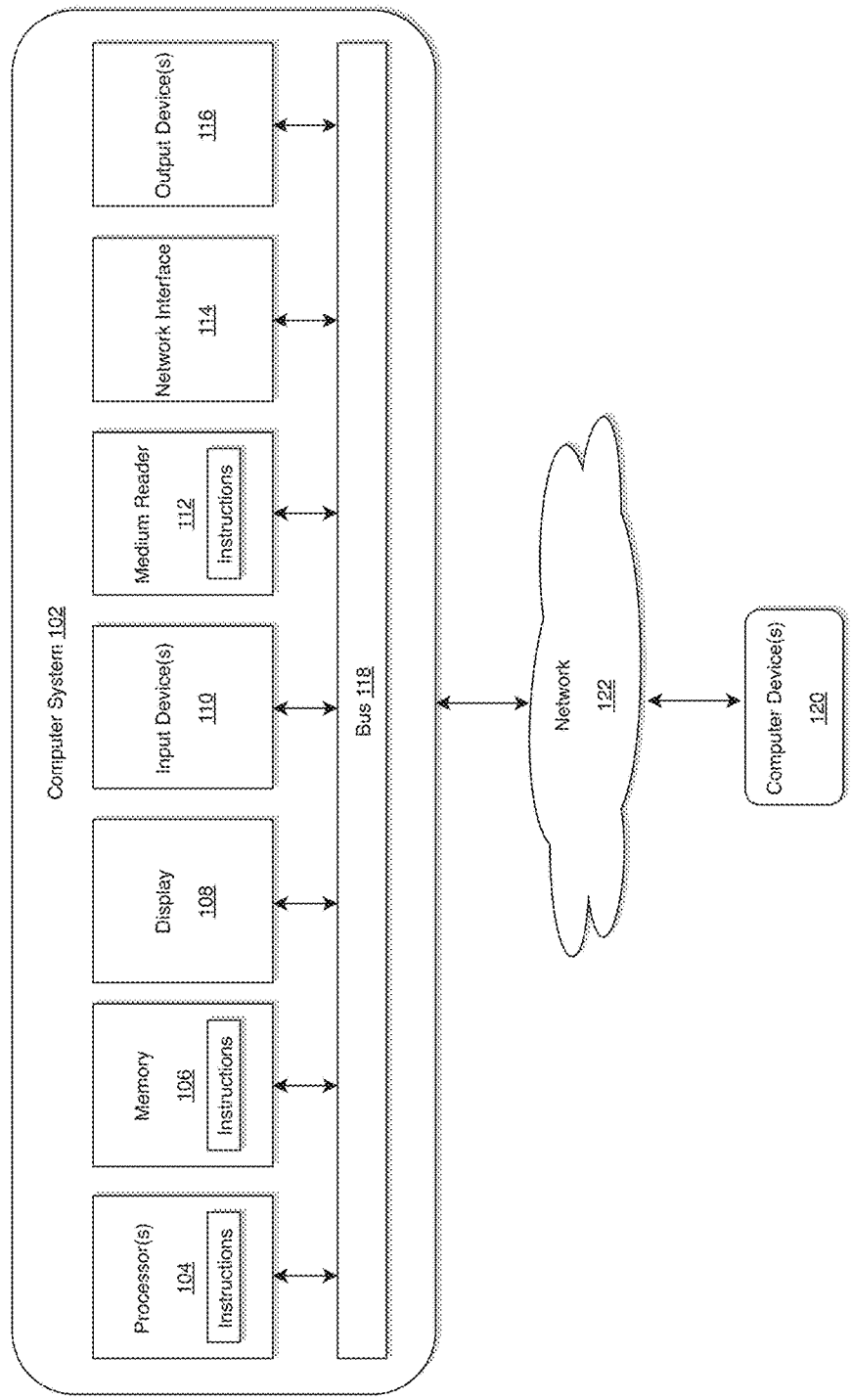
FIG. 1 illustrates a computer system for intelligent identification of content data in files, preview check, and multi-recipients control in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing an intelligent identification of content data module, multi-recipients control module, and enabling preview check of attachment files that may include hidden and filtered data and formula in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing an intelligent identification of content data module, and multi-recipients control module, and preview check, that provide platforms for intelligently scanning and detecting the hidden content data in files (e.g., Microsoft office applications, but the disclosure is not limited thereto), and tagging and highlighting (i.e., preview check) the data to a user before the data is being sent out externally to one or more email recipients, thereby addressing and/or eliminating data leakages in a quick, expedited, and accurate manner and minimizing data loss, but the disclosure is not limited thereto. According to exemplary embodiments, the Microsoft office applications may include Excel files, but the disclosure is not limited thereto. Although Excel file is being described herein as an exemplary use case, the disclosure is not limited thereto. The disclosed intelligent detection of hidden or filtered or formula content can be extended to other similar applications, e.g., Google sheets.

Figure 2:
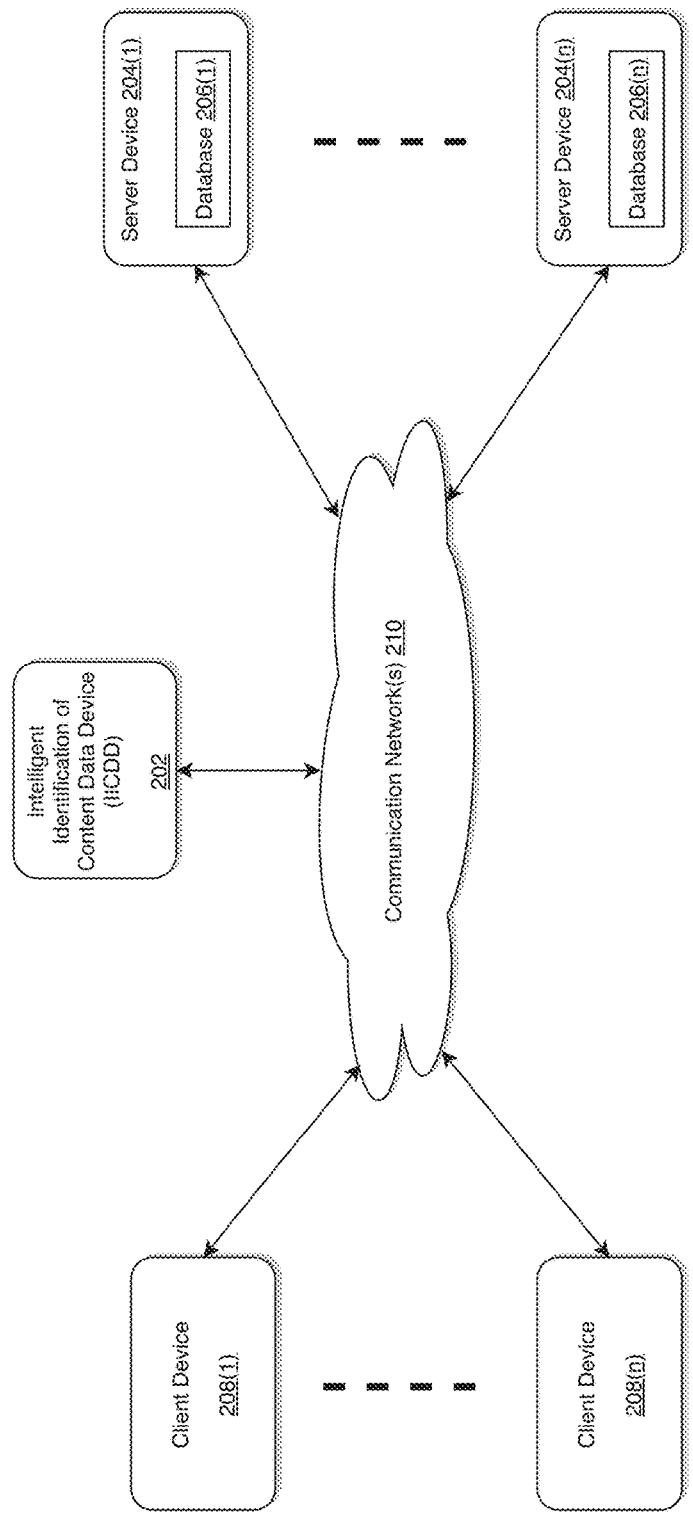
FIG. 2 illustrates an exemplary diagram of a network environment with an intelligent identification of content data device in accordance with an exemplary embodiment.

Referring to FIG. 2, a schematic of an exemplary network environment 200 for implementing an intelligent identification of content data device (IICDD) of the instant disclosure is illustrated.

According to exemplary embodiments, the above-described problems associated with conventional data processing systems may be overcome by implementing an IICDD 202 as illustrated in FIG. 2 by intelligently scanning and detecting the content data in files (e.g., Excel files), and tagging and highlighting the data to a user before the data is being sent out externally to multiple email recipients, thereby addressing and/or eliminating data leakages in a quick, expedited, and accurate manner and minimizing data loss, but the disclosure is not limited thereto.

The IICDD 202 may be the same or similar to the computer system 102 as described with respect to FIG. 1.

The IICDD 202 may store one or more applications that can include executable instructions that, when executed by the IICDD 202, cause the IICDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the IICDD 202 itself, may be located in virtual server(s) running in a cloud-based computing environment rather than being tied to one or more specific physical network computing devices. Also, the application(s) may be running in one or more virtual machines (VMs) executing on the IICDD 202. Additionally, in one or more embodiments of this technology, virtual machine(s) running on the IICDD 202 may be managed or supervised by a hypervisor.

In the network environment 200 of FIG. 2, the IICDD 202 is coupled to a plurality of server devices 204(1)-204(n) that hosts a plurality of databases 206(1)-206(n), and also to a plurality of client devices 208(1)-208(n) via communication network(s) 210. A communication interface of the IICDD 202, such as the network interface 114 of the computer system 102 of FIG. 1, operatively couples and communicates between the IICDD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the IICDD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The IICDD 202 may be a standalone device or integrated with one or more other devices or apparatuses, such as one or more of the server devices 204(1)-204(n), for example. In one particular example, the IICDD 202 may be hosted by one of the server devices 204(1)-204(n), and other arrangements are also possible. Moreover, one or more of the devices of the IICDD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the IICDD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the IICDD 202 that may be configured for intelligently scanning and detecting the hidden content data in files (e.g., excel files), and tagging and highlighting the data to a user before the data is being sent out externally to multiple email recipients, thereby addressing and/or eliminating data leakages in a quick, expedited, and accurate manner and minimizing data loss, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the IICDD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the IICDD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the IICDD 202, the server devices 204(1)-204(n), or the client devices 208(1)-208(n), for example, may be configured to operate as virtual instances on the same physical machine. For example, one or more of the IICDD 202, the server devices 204(1)-204(n), or the client devices 208(1)-208(n) may operate on the same physical device rather than as separate devices communicating through communication network(s) 210. Additionally, there may be more or fewer IICDDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
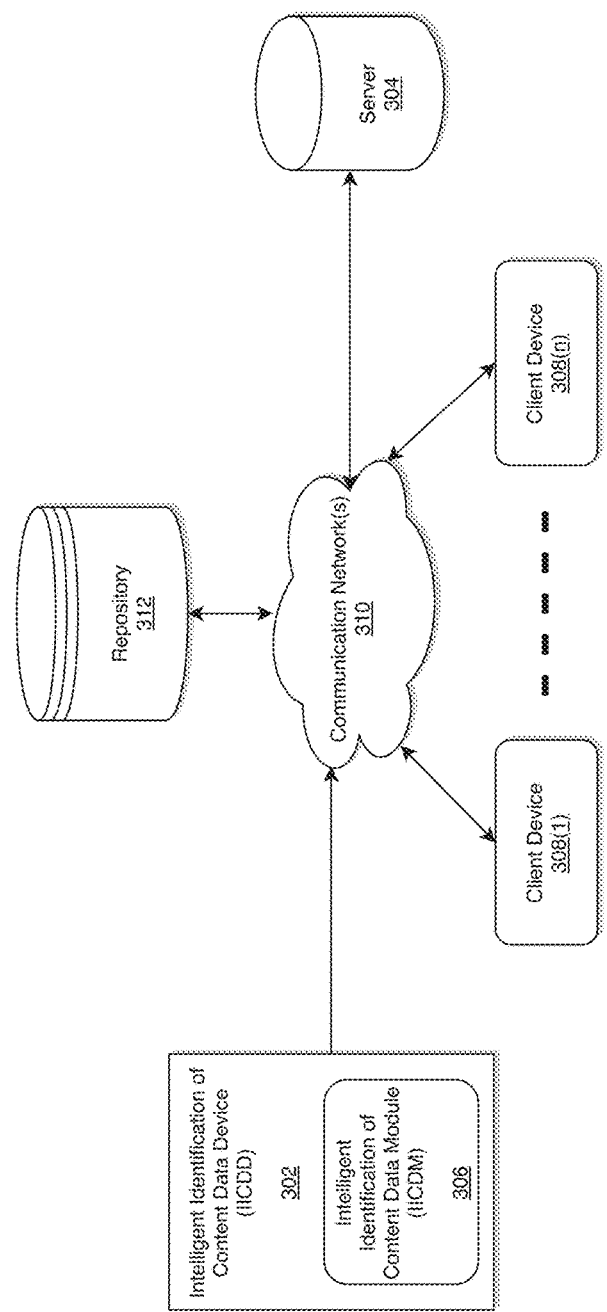
FIG. 3 illustrates a system diagram for implementing an intelligent identification of content data device with an intelligent identification of content data module in accordance with an exemplary embodiment.

FIG. 3 illustrates a system diagram for implementing an IICDD with an IICDM in accordance with an exemplary embodiment.

As illustrated in FIG. 3, the IICDD 302 including the IICDM 306 may be connected to a server 304, and a repository 312 via a communication network 310. The IICDD 302 may also be connected to a plurality of client devices 308(1)-308(n) via the communication network 310, but the disclosure is not limited thereto. According to exemplary embodiments, the IICDM 306 may be implemented within the client devices 308(1)-308(n), but the disclosure is not limited thereto. According to exemplary embodiments, the client devices 308(1)-308(n) may be utilized for software application development and machine learning model generations, but the disclosure is not limited thereto.

According to exemplary embodiment, the IICDD 302 is described and shown in FIG. 3 as including the IICDM 306, although it may include other rules, policies, modules, databases, or applications, for example. According to exemplary embodiments, the repository 312 may be embedded within the IICDD 302. Although only one repository 312 is illustrated in FIG. 3, according to exemplary embodiments, a plurality of repositories 312 may be provided. The repository 312 may include one or more memories configured to store login information, data files, data content, etc., but the disclosure is not limited thereto. For example, the repository 312 may include one or more memories configured to store information including: rules, programs, production requirements, configurable threshold values defined by a product team to validate against service level objective (SLO), machine learning models, log data, hash values, etc., but the disclosure is not limited thereto. According to exemplary embodiments, the IICDM 306 may be configured to be storage platform agnostic—configured to be deployed across multiple storage layers.

According to exemplary embodiments, the IICDM 306 may be configured to receive continuous feed of data from the repository 312 and the server 304 via the communication network 310.

As will be described below, the IICDM 306 may be configured to receive a request from a user to send an electronic mail (email) for external communication outside of an organization's internal network; detect whether the email includes a file as an attachment to the email: scan the file for content data; tag and highlight the content data for preview check and for receiving user's input of confirmation data when it is determined that the email includes an external recipient; receive the user's input of confirmation data whether the external recipient is a recipient who is authorized to obtain the file including the content data: and transmitting the email to the external recipient in response to receiving a positive user's input of confirmation data, but the disclosure is not limited thereto.

The plurality of client devices 308(1)-308(n) are illustrated as being in communication with the IICDD 302. In this regard, the plurality of client devices 308(1)-308(n) may be "clients" of the IICDD 302 and are described herein as such. Nevertheless, it is to be known and understood that the plurality of client devices 308(1)-308(n) need not necessarily be "clients" of the IICDD 302, or any entity described in association therewith herein. Any additional or alternative relationship may exist between either or more of the plurality of client devices 308(1)-308(n) and the IICDD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the IICDD 302 via broadband or cellular communication. Of course, these embodiments are merely exemplary and are not limiting or exhaustive.

Figure 4:
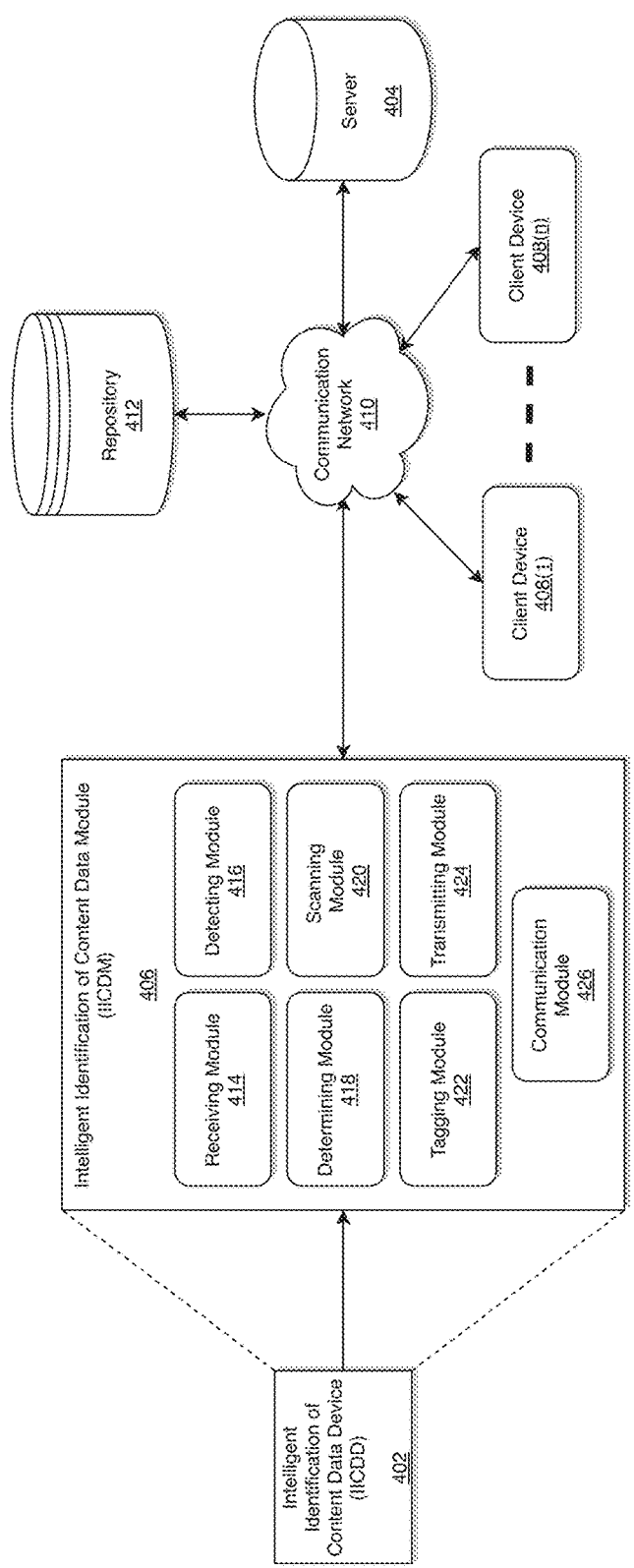
FIG. 4 illustrates a system diagram for implementing an intelligent identification of content data module of FIG. 3 in accordance with an exemplary embodiment.

FIG. 4 illustrates a system diagram for implementing an intelligent identification of hidden content module of FIG. 3 in accordance with an exemplary embodiment. As illustrated in FIG. 4, the system 400 may include an IICDD 402 within which an IICDM 406 may be embedded, a repository 412, a server 404, client devices 408(1)-408(n), and a communication network 410. According to exemplary embodiments, the IICDD 402, IICDM 406, repository 412, the server 404, the client devices 408(1)-408(n), and the communication network 410 as illustrated in FIG. 4 may be the same or similar to the IICDD 302, the IICDM 306, the repository 312, the server 304, the client devices 308(1)-308(n), and the communication network 310, respectively, as illustrated in FIG. 3.

According to exemplary embodiments, the repository 312, 412 may also be a cloud-based repository that supports user authentication, repository security, and integration with existing databases and developments, but the disclosure is not limited thereto.

As illustrated in FIG. 4, the IICDM 406 may include a receiving module 414, a detecting module 416, a determining module 418, a scanning module 420, a tagging module 422, a transmitting module 424, and a communication module 426. According to exemplary embodiments, the repository 412 may be external to the IICDD 402 may include various systems that are managed and operated by an organization. Alternatively, according to exemplary embodiments, the repository 412 may be embedded within the IICDD 402 and/or the IICDM 406.

The process may be executed via the communication module 426 and the communication network 410, which may comprise plural networks as described above. For example, in an exemplary embodiment, the various components of the IICDM 406 may communicate with the server 404, and the repository 412 via the communication module 426 communication network 410. Of course, these embodiments are merely exemplary and are not limiting or exhaustive.

According to exemplary embodiments, the communication network 410 and the communication module 426 may be configured to establish a link between the repository 412, the client devices 408(1)-408(n) and the IICDM 406.

According to exemplary embodiments, each of the receiving module 414, detecting module 416, determining module 418, scanning module 420, tagging module 422, transmitting module 424, and the communication module 426 may be implemented by microprocessors or similar, they may be programmed using software (e.g., microcode) to perform various functions discussed herein and may optionally be driven by firmware and/or software. Alternatively, each of the receiving module 414, detecting module 416, determining module 418, scanning module 420, tagging module 422, transmitting module 424, and the communication module 426 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 414, detecting module 416, determining module 418, scanning module 420, tagging module 422, transmitting module 424, and the communication module 426 may be physically separated into two or more interacting and discrete blocks, units, devices, and/or modules without departing from the scope of the inventive concepts.

According to exemplary embodiments, each of the receiving module 414, detecting module 416, determining module 418, scanning module 420, tagging module 422, transmitting module 424, and the communication module 426 of the IICDM 406 may be called by corresponding application programming interface (API).

Although Excel file is being described herein as an exemplary use case, the disclosure is not limited thereto. The disclosed intelligent detection of hidden or filtered or formula content can be extended to other similar applications, e.g., Google sheets.

According to exemplary embodiments, the receiving module 416 may be configured to receive a request from a user to send an electronic mail (email) for external communication outside of an organization's internal network. The detecting module 416 may be configured to detect whether the email includes a file as an attachment to the email. The determining module 418 may be configured to determine, in response to a positive detection by the detection module 416, whether the file is an Excel file.

According to exemplary embodiments, the scanning module 420 may be configured to scan, in response to a positive determination by the determining module 418, the Excel file for content data. According to exemplary embodiments, the content data may include one or more of the following data: hidden data, filtered sheets data, filtered columns data, filtered rows data, and data containing Excel formulas, but the disclosure is not limited thereto. The IICDM 406 may also be configured to generate a hover box (see, e.g., FIGS. 5 and 6) indicating location of content data including location of hidden data, filtered content data, or formulas within the Excel file, but the disclosure is not limited thereto.

Figure 5:
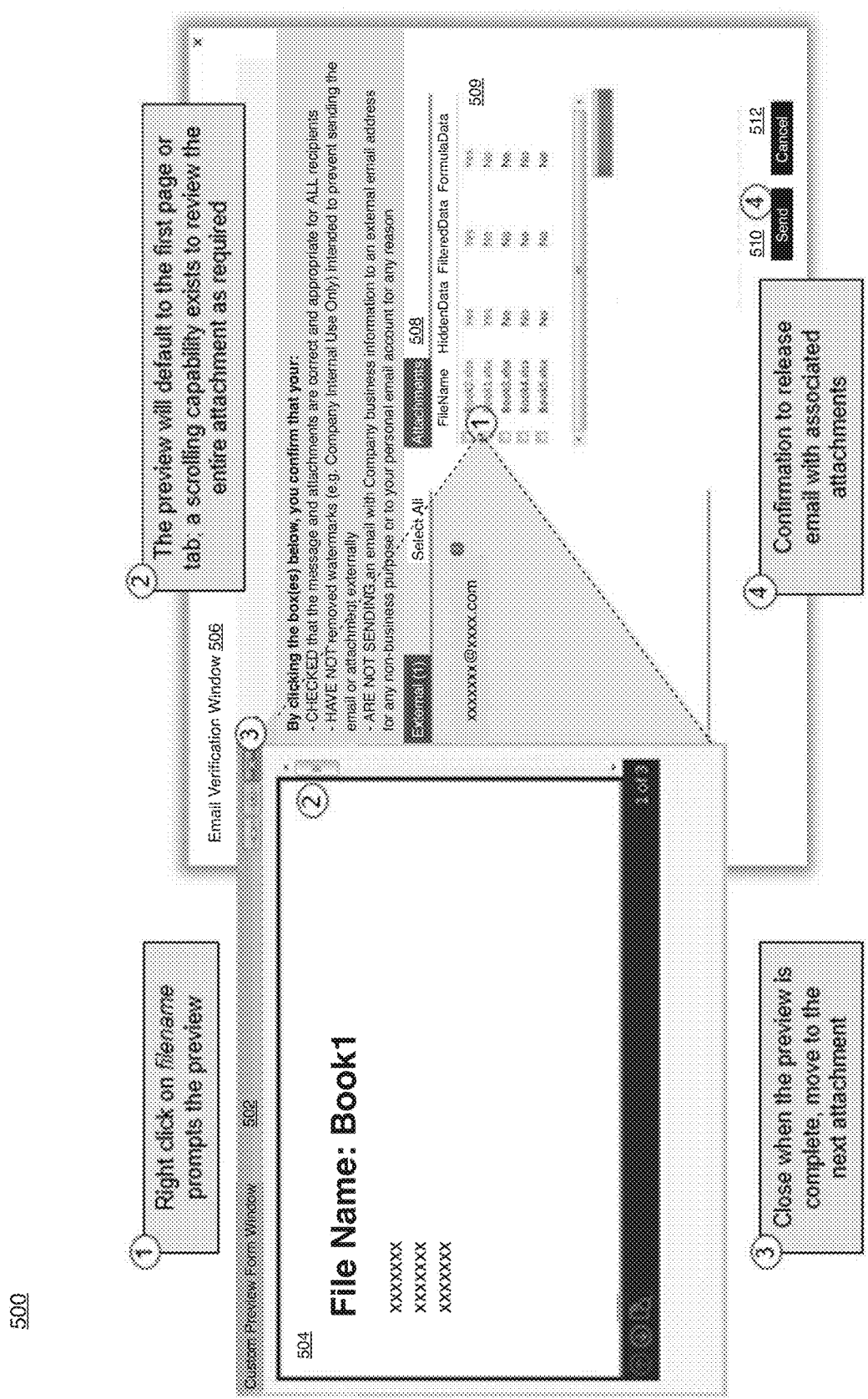
FIG. 5 illustrates an exemplary preview check of content data in attachment files in according with an exemplary embodiment.

According to exemplary embodiments, the tagging module 422 may be configured to tag and highlight the content data for receiving user's input of confirmation data when it is determined that the email includes an external recipient (see, e.g., FIGS. 5 and 6). The IICDM 406 may also be configured to generate a hover box indicating location of content data including location of hidden data, filtered content data, or formulas within the Excel file, but the disclosure is not limited thereto. According to exemplary embodiments, "Yes" and "No" binary indicator by design with colored font (i.e., red) to highlight risk for each of the file name, hidden data, filtered data, formula data, etc., but the disclosure is not limited thereto (see, e.g., FIGS. 5 and 6).

According to exemplary embodiments, the receiving module 414 may be configured to receive the user's input of confirmation data whether the external recipient is a recipient who is authorized to obtain the Excel file including the content data. The transmitting module 424 may be configured to transmit the email to the external recipient in response to receiving a positive user's input of confirmation data.

According to exemplary embodiments, the transmitting module 424 may be further configured to block transmission of the email to the external recipient in response to receiving a negative user's input of confirmation data.

According to exemplary embodiments, IICDM 406 may be further configured to remove the content data from the Excel file in response to receiving a negative user's input of confirmation data and the transmitting module 424 may transmit the email to the external recipient with the attached Excel file having the content data being removed from the Excel file.

FIG. 5 illustrates an exemplary preview check of content data in attachment files in according with an exemplary embodiment.

According to exemplary embodiments, the IICDM 406 initially checks whether domains selected are correct. The IICDM 406 than executes the hidden and filtered content and formula check for any attached file in the email—where red denotes particular risk(s).

As illustrated in FIG. 5, the preview 500 may include a custom preview form window 502 and an email verification window 506. In this exemplary embodiments, the detecting module 416 detects that the email includes five attachments 508. Right click on a filename from the table 509 prompts the preview (i.e., custom preview form window 502) which displays the file in window 504 (i.e., File Name: Book 1) (see step 1 in FIG. 5). The preview will default to the first page or tab. According to exemplary embodiments, a scrolling capability may be implemented by the IICDM 406 to review the entire attachment (i.e., Microsoft office attachments) as required (see step 2 in FIG. 5). A user can close the custom preview form window 502 when preview is complete and can move to the next attachment by right clicking (or hovering) on another file displayed on the table 509 (see step 3 in FIG. 5).

By right clicking (or hovering) to preview the file will support mitigating the risk of the wrong file inadvertently being selected and released, e.g., where a staff member: has applied poor file naming convention: has attached the file(s) from congested desktop icons rather than a structured folder, does not utilize the email moderation control (EMC), etc.

The user of the IICDM 406 may confirm the release of the email with associated attachments and press the send icon 510 to send the email with associated attachments to the selected email recipients (see step 4 in FIG. 5). The user of the IICDM 406 may also cancel sending the email with associated attachments by pressing the cancel icon 512.

FIG. 6 illustrates another an exemplary preview check of content data in attachment files in according with an exemplary embodiment. As illustrated in FIG. 6, the email verification window 602 illustrates that the email had five attachments 608 and two Excel files had hidden and/or filtered sheets/columns/rows, and/or formulas (see table 609). The hidden and filtered content and formula check is executed if the email has an external recipient. As illustrated in FIG. 6, at step 1, the IICDM 406 performs external domain check combined with enhanced check as disclosed above with reference to FIG. 5. At step 2, report on hidden and filtered content and formulas is presented on the table 609. At step 3, the IICDM 406 implements active filters for hidden and filtered content and formulas. At step 4, the IICDM 406 implements 'Yes' and 'No' binary indicators by design with red font to highlight risk. At step 5, the IICDM 406 implements hover box indicating location of hidden or filtered content or formulas. At step 6, the IICDM 406 displays processing speed. Metadata may be added when document is saved to minimize delays. At step 7, the user of the IICDM 406 may confirm the release of the email with associated attachments and press the send icon 610 to send the email with associated attachments to the selected email recipients. The user of the IICDM 406 may also cancel sending the email with associated attachments by pressing the cancel icon 612.

According to exemplary embodiments, the IICDM 406 may further configured to implement multi-recipients control features.

Figure 7:
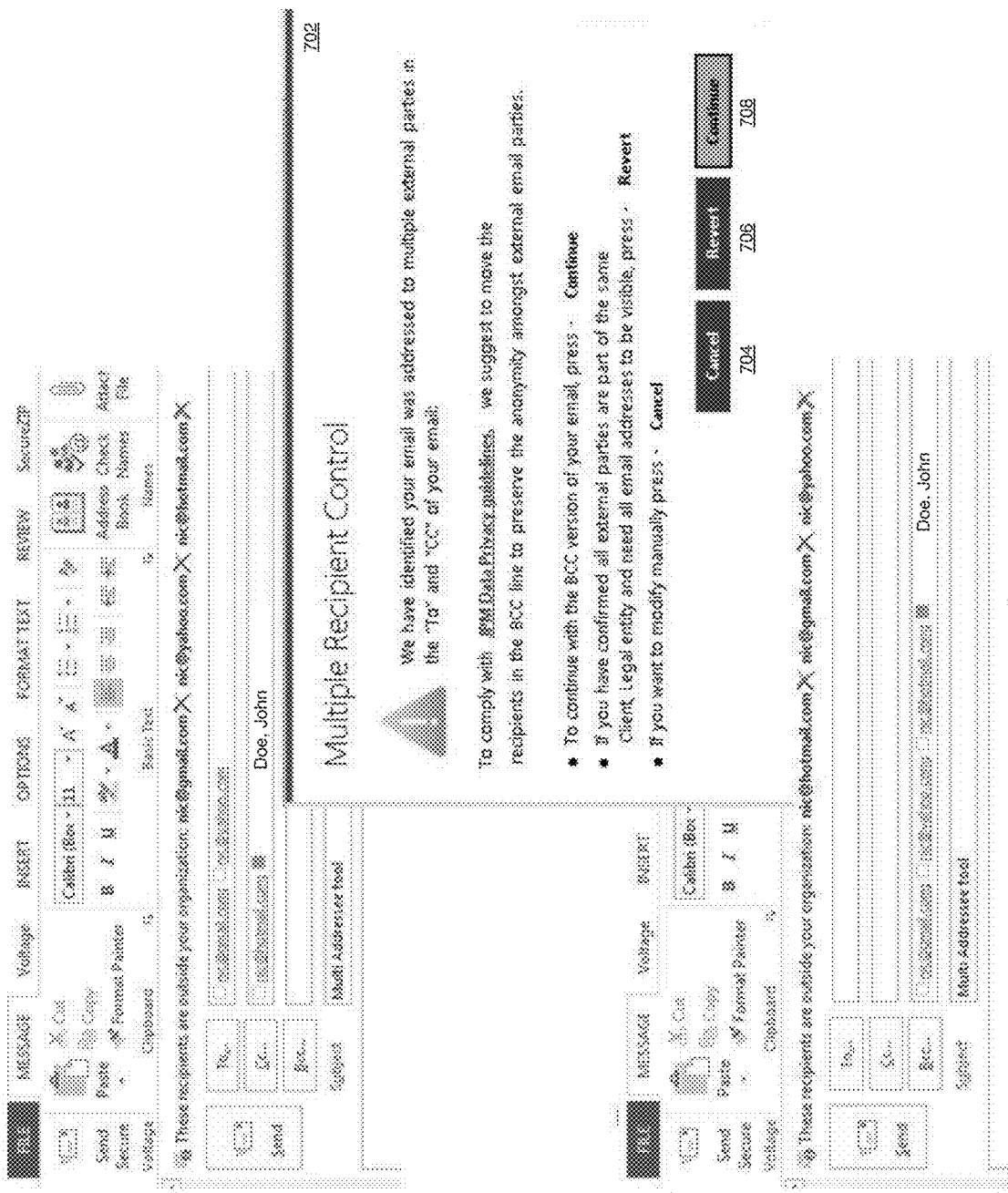
FIG. 7 illustrates an exemplary multi-recipients control features effected by the intelligent identification of content data module of FIG. 4 in according with an exemplary embodiment.

FIG. 7 illustrates an exemplary multi-recipients control features effected by the IICDM 406 in according with an exemplary embodiment. As illustrated in FIG. 7, the IICDM 406 may be configured to determine, by utilizing the determining module 418 whether the email is addressed to multiple external recipients in a "to" and/or a "cc" line of the email: and prompt a message box 702 onto the GUI 700 for receiving user's input for selecting a cancel icon 704, a revert icon 706, or a continue icon 708.

According to exemplary embodiments, the transmitting module 424 may be configured to automatically transmit the email by putting all recipients in a "bcc" line of the email in response to receiving user's input for selecting the continue icon 708.

According to exemplary embodiments, the transmitting module 424 may be further configured to automatically transmit the email by maintaining all recipients in the original "to" and/or "cc" line of the email in response to receiving user's input for selecting the revert icon 706.

According to exemplary embodiments, the transmitting module 424 may be further configured to automatically block transmission of the email in response to receiving user's input for selecting the cancel icon 704 so that the user may modify the recipients manually.

Figure 8:
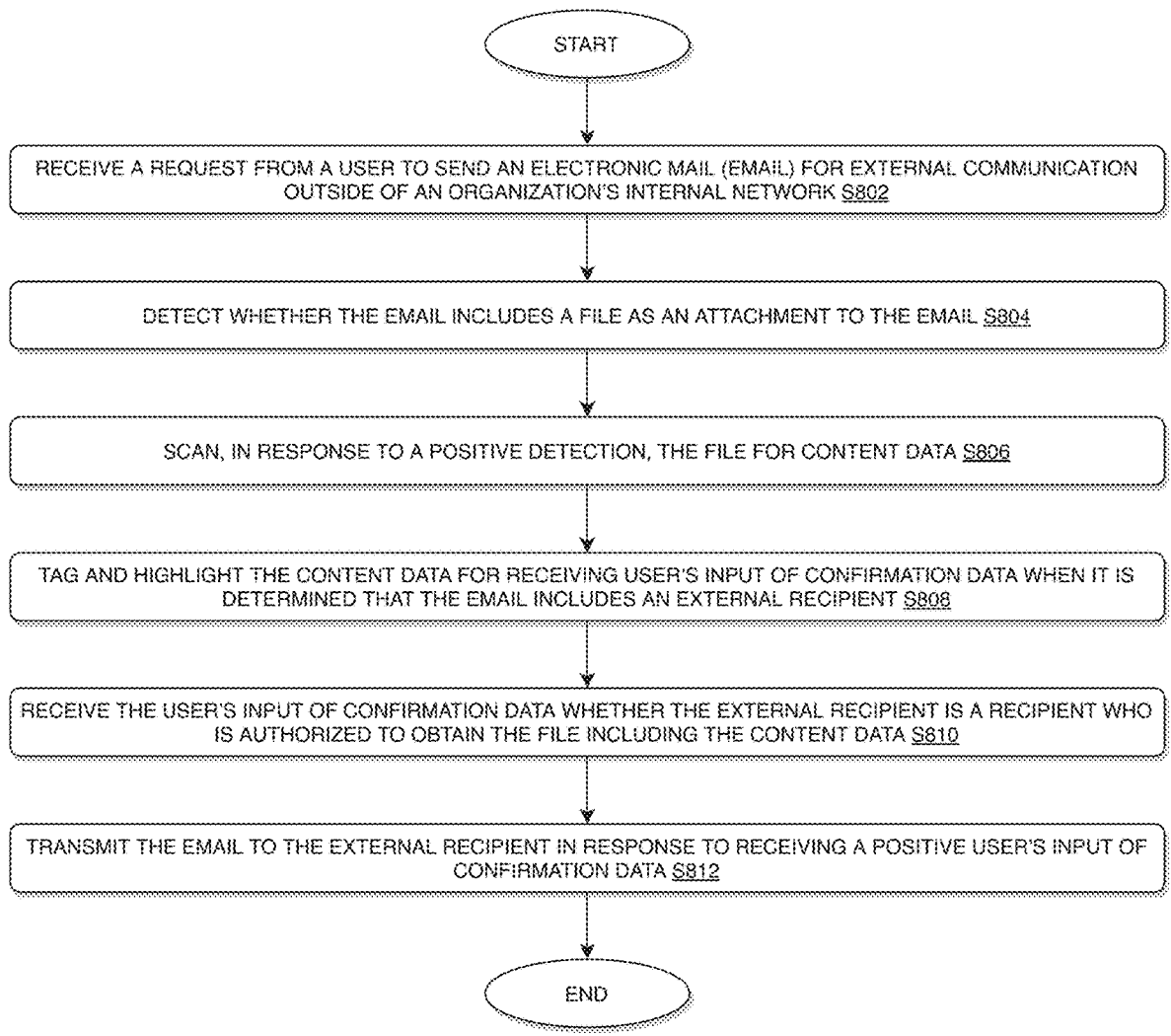
FIG. 8 illustrates a flow diagram for intelligent identification of content data in files, preview check, and multi-recipients control in accordance with an exemplary embodiment.

FIG. 8 illustrates a flow diagram for intelligent identification of content data in files, preview check, and multi-recipients control in accordance with an exemplary embodiment.

In the process 800 of FIG. 8, at step S802, a request may be received from a user to send an electronic mail (email) for external communication outside of an organization's internal network.

At step S804, the process 800 may detect whether the email includes a file as an attachment to the email.

At step S806, the process 800 may scan, in response to a positive detection, the file for content data.

At step S808, the process 800 may tag and highlight the content data for receiving user's input of confirmation data when it is determined that the email includes an external recipient.

At step S810, the process 800 may receive the user's input of confirmation data whether the external recipient is a recipient who is authorized to obtain the file including content data.

At step S812, the process 800 may transmit the email to the external recipient in response to receiving a positive user's input of confirmation data.

According to exemplary embodiments, the process 800 may further include: generating a hover box indicating location of content data including location of hidden data, filtered content data, or formulas within the file, wherein the location may include one or more of the locations in the file: sheets, columns, and rows, but the disclosure is not limited thereto.

According to exemplary embodiments, the process 800 may further include: blocking transmission of the email to the external recipient in response to receiving a negative user's input of confirmation data.

According to exemplary embodiments, the process 800 may further include: removing the content data from the file in response to receiving a negative user's input of confirmation data; and transmitting the email to the external recipient with the attached file having the content data being removed from the file.

According to exemplary embodiments, the process 800 may further include: determining whether the email is addressed to multiple external recipients in a "to" and/or a "cc" line of the email: and prompting a message box for receiving user's input for selecting a cancel icon, a revert icon, or a continue icon.

According to exemplary embodiments, the process 800 may further include: automatically transmitting the email by putting all recipients in a "bcc" line of the email in response to receiving user's input for selecting the continue icon.

According to exemplary embodiments, the process 800 may further include: automatically transmitting the email by maintaining all recipients in the original "to" and/or "cc" line of the email in response to receiving user's input for selecting the revert icon.

According to exemplary embodiments, the process 800 may further include: automatically blocking transmission of the email in response to receiving user's input for selecting the cancel icon.

According to exemplary embodiments, the IICDD 402 may include a memory (e.g., a memory 106 as illustrated in FIG. 1) which may be a non-transitory computer readable medium that may be configured to store instructions for implementing an IICDM 406 for intelligent identification of hidden content in files and implementing multi-recipients control features disclosed herein. The IICDD 402 may also include a medium reader (e.g., a medium reader 112 as illustrated in FIG. 1) which may be configured to read any one or more sets of instructions, e.g., software, from any of the memories described herein. The instructions, when executed by a processor embedded within the IICDM 406 or within the IICDD 402, may be used to perform one or more of the methods and processes as described herein. In a particular embodiment, the instructions may reside completely, or at least partially, within the memory 106, the medium reader 112, and/or the processor 104 (see FIG. 1) during execution by the IICDD 402.

For example, the instructions, when executed, may cause the processor 104 to perform the following: receiving a request from a user to send an electronic mail (email) for external communication outside of an organization's internal network; detecting whether the email includes a file as an attachment to the email; scanning, in response to a positive detection, the file for content data; tagging and highlighting the content data for receiving user's input of confirmation data when it is determined that the email includes an external recipient: receiving the user's input of confirmation data whether the external recipient is a recipient who is authorized to obtain the file including content data; and transmitting the email to the external recipient in response to receiving a positive user's input of confirmation data.

According to exemplary embodiments, the instructions, when executed, may further cause the processor 104 to perform the following: generating a hover box indicating location of content data including location of hidden data, filtered content data, or formulas within the file, wherein the location may include one or more of the locations in the file: sheets, columns, and rows, but the disclosure is not limited thereto.

According to exemplary embodiments, the instructions, when executed, may further cause the processor 104 to perform the following: blocking transmission of the email to the external recipient in response to receiving a negative user's input of confirmation data.

According to exemplary embodiments, the instructions, when executed, may further cause the processor 104 to perform the following: removing the content data from the file in response to receiving a negative user's input of confirmation data: and transmitting the email to the external recipient with the attached file having the content data being removed from the file.

According to exemplary embodiments, the instructions, when executed, may further cause the processor 104 to perform the following: determining whether the email is addressed to multiple external recipients in a "to" and/or a "cc" line of the email: and prompting a message box for receiving user's input for selecting a cancel icon, a revert icon, or a continue icon.

According to exemplary embodiments, the instructions, when executed, may further cause the processor 104 to perform the following: automatically transmitting the email by putting all recipients in a "bcc" line of the email in response to receiving user's input for selecting the continue icon.

According to exemplary embodiments, the instructions, when executed, may further cause the processor 104 to perform the following: automatically transmitting the email by maintaining all recipients in the original "to" and/or "cc" line of the email in response to receiving user's input for selecting the revert icon.

According to exemplary embodiments, the instructions, when executed, may further cause the processor 104 to perform the following: automatically blocking transmission of the email in response to receiving user's input for selecting the cancel icon.

According to exemplary embodiments as disclosed above in FIGS. 1-6, technical improvements effected by the instant disclosure may include platforms for implementing an intelligent identification of content data module and multi-recipients control module that provide platforms for intelligently scanning and detecting hidden data, filtered data, and formulas in files (e.g., Microsoft office applications, but the disclosure is not limited thereto), and tagging and highlighting the data to a user for preview check before the data is being sent out externally to one or more email recipients, thereby addressing and/or eliminating data leakages in a quick, expedited, and accurate manner and minimizing data loss, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for intelligent identification of content data in files by utilizing one or more processors and one or more memories, the method comprising:
   receiving a request from a user to send an electronic mail (email) for external communication outside of an organization's internal network;
   detecting whether the email includes a file as an attachment to the email;
   scanning the file for content data;
   tagging and highlighting the content data as preview check and for receiving user's input of confirmation data when it is determined that the email includes an external recipient;
   generating a hover box indicating location of the content data including location of hidden data, filtered content data, and formulas within the file;
   highlighting risk for each of file name, the hidden data, the filtered content data, and formulas within the file by designating "Yes" and "No" binary indicator by design with colored front;
   determining whether the email is addressed to multiple external recipients in "to" and "cc" line of the email;
   prompting a message box for receiving user's input for selecting a cancel icon, or a revert icon, or a continue icon, wherein the cancel icon is configured to receive a user's input to modify the multiple external recipients manually; wherein the revert icon is configured to receive a user's input to confirm that the multiple external recipients are part of a same client and legal entity and that all the multiple external recipients' email addresses to be visible; and wherein the continue icon is configured to receive user's input to continue with a "bcc" version of the email;
   receiving the user's input of confirmation data whether the external recipient is a recipient who is authorized to obtain the file including the content data; and
   transmitting the email to the external recipient in response to receiving a positive user's input of confirmation data.

2. The method according to claim 1, wherein the content data includes one or more of the following data: hidden data, filtered sheets data, filtered columns data, filtered rows data, and data containing formulas.

3. The method according to claim 1, wherein the location includes one or more of the locations in the file: sheets, columns, and rows.

4. The method according to claim 1, further comprising:
   blocking transmission of the email to the external recipient in response to receiving a negative user's input of confirmation data.

5. The method according to claim 1, further comprising:
   removing the content data from the file in response to receiving a negative user's input of confirmation data; and
   transmitting the email to the external recipient with the attached file having the content data being removed from the file.

6. The method according to claim 1, further comprising:
   automatically transmitting the email by putting all recipients in a "bcc" line of the email in response to receiving the user's input for selecting the continue icon.

7. The method according to claim 1, further comprising:
   automatically transmitting the email by maintaining all recipients in the original "to" and "cc" line of the email in response to receiving the user's input for selecting the revert icon.

8. The method according to claim 1, further comprising:
   automatically blocking transmission of the email in response to receiving the user's input for selecting the cancel icon.

9. A system for intelligent identification of content data in files, the system comprising:
   a processor; and
   one or more memories operatively connected to the processor via a communication network, wherein the processor is configured to:
   receive a request from a user to send an electronic mail (email) for external communication outside of an organization's internal network;
   detect whether the email includes a file as an attachment to the email;
   scan, in response to a positive determination, the file for content data;
   tag and highlight the content data for preview check and for receiving user's input of confirmation data when it is determined that the email includes an external recipient;
   generate a hover box indicating location of the content data including location of hidden data, filtered content data, and formulas within the file;

highlight risk for each of file name, the hidden data, the filtered content data, and formulas within the file by designating "Yes" and "No" binary indicator by design with colored front;

determine whether the email is addressed to multiple external recipients in "to" and "cc" line of the email;

prompt a message box for receiving user's input for selecting a cancel icon, or a revert icon, or a continue icon, wherein the cancel icon is configured to receive a user's input to modify the multiple external recipients manually; wherein the revert icon is configured to receive a user's input to confirm that the multiple external recipients are part of a same client and legal entity and that all the multiple external recipients' email addresses to be visible; and wherein the continue icon is configured to receive user's input to continue with a "bcc" version of the email;

receive the user's input of confirmation data whether the external recipient is a recipient who is authorized to obtain the file including the content data; and transmit the email to the external recipient in response to receiving a positive user's input of confirmation data.

10. The system according to claim 9, wherein the content data includes one or more of the following data: hidden data, filtered sheets data, filtered columns data, filtered rows data, and data containing formulas.

11. The system according to claim 9, wherein the location includes one or more of the locations in the file: sheets, columns, and rows.

12. The system according to claim 9, wherein the processor is further configured to:

block transmission of the email to the external recipient in response to receiving a negative user's input of confirmation data.

13. The system according to claim 9, wherein the processor is further configured to:

remove the content data from the Excel file in response to receiving a negative user's input of confirmation data; and transmit the email to the external recipient with the attached file having the content data being removed from the file.

14. The system according to claim 9, wherein the processor is further configured to:

automatically transmit the email by putting all recipients in a "bcc" line of the email in response to receiving the user's input for selecting the continue icon.

15. The system according to claim 9, wherein the processor is further configured to:

automatically transmit the email by maintaining all recipients in the original "to" and "cc" line of the email in response to receiving the user's input for selecting the revert icon.

16. The system according to claim 9, further comprising: automatically block transmission of the email in response to receiving the user's input for selecting the cancel icon.

17. A non-transitory computer readable medium configured to store instructions for intelligent identification of content data in files, wherein when executed, the instructions cause a processor to:

receive a request from a user to send an electronic mail (email) for external communication outside of an organization's internal network;

detect whether the email includes a file as an attachment to the email;

scan, in response to a positive determination, the file for the content data;

tag and highlight the content data for preview check and for receiving user's input of confirmation data when it is determined that the email includes an external recipient;

generate a hover box indicating location of the content data including location of hidden data, filtered content data, and formulas within the file;

highlight risk for each of file name, the hidden data, the filtered content data, and formulas within the file by designating "Yes" and "No" binary indicator by design with colored front;

determine whether the email is addressed to multiple external recipients in "to" and "cc" line of the email;

prompt a message box for receiving user's input for selecting a cancel icon, or a revert icon, or a continue icon, wherein the cancel icon is configured to receive a user's input to modify the multiple external recipients manually; wherein the revert icon is configured to receive a user's input to confirm that the multiple external recipients are part of a same client and legal entity and that all the multiple external recipients' email addresses to be visible; and wherein the continue icon is configured to receive user's input to continue with a "bcc" version of the email;

receive the user's input of confirmation data whether the external recipient is a recipient who is authorized to obtain the file including the content data; and transmit the email to the external recipient in response to receiving a positive user's input of confirmation data.

18. The non-transitory computer readable medium according to claim 17, wherein when executed, the instructions further cause the processor to:

automatically transmit the email by putting all recipients in a "bcc" line of the email in response to receiving the user's input for selecting the continue icon.

19. The non-transitory computer readable medium according to claim 17, wherein when executed, the instructions further cause the processor to:

automatically transmit the email by maintaining all recipients in the original "to" and "cc" line of the email in response to receiving the user's input for selecting the revert icon.

20. The non-transitory computer readable medium according to claim 17, wherein when executed, the instructions further cause the processor to:

automatically block transmission of the email in response to receiving the user's input for selecting the cancel icon.

* * * * *